United States Patent
Prajescu (10) Patent No.: US 8,028,439 B2
(45) Date of Patent: Oct. 4, 2011

(54) CLOTHES DRYER BEARING GASKET SUPPORT

(75) Inventor: Gabriel Prajescu, Dollard-des-Ormeaux (CA)

(73) Assignee: Mabe Canada Inc., Burlington (CA)

( * ) Notice: Subject to any disclaimer, the term of this patent is extended or adjusted under 35 U.S.C. 154(b) by 667 days.

(21) Appl. No.: 12/222,612

(22) Filed: Aug. 13, 2008

(65) Prior Publication Data

US 2009/0083991 A1 Apr. 2, 2009

(30) Foreign Application Priority Data

Sep. 28, 2007 (CA) .................................... 2604671

(51) Int. Cl.
*F26B 11/02* (2006.01)

(52) U.S. Cl. .............. 34/601; 34/606; 34/610; 219/739; 219/751; 414/149; 705/14; 165/89; 165/90; 68/5 C; 68/20; 285/24; 285/121.3

(58) Field of Classification Search .................... 34/600, 34/601, 606, 610, 242, 218, 86, 90; 705/14; 68/5 C, 20; 414/149; 285/24, 121.3; 219/739, 219/751; 165/89, 90
See application file for complete search history.

(56) References Cited

U.S. PATENT DOCUMENTS

| | | | | |
|---|---|---|---|---|
| 1,621,706 A * | 3/1927 | Alexander et al. | ................. | 34/85 |
| 1,763,629 A * | 6/1930 | Hopkins | ......................... | 34/549 |
| 1,884,331 A * | 10/1932 | Staege | .............................. | 73/73 |
| 1,928,004 A * | 9/1933 | Bullerjahn | ....................... | 165/92 |
| 1,933,819 A * | 11/1933 | Miles et al. | ...................... | 159/12 |
| 2,068,181 A * | 1/1937 | Hurxthal | ......................... | 264/144 |
| 2,250,773 A * | 7/1941 | Overton | .......................... | 34/388 |
| 2,260,501 A * | 10/1941 | Wynd | ............................... | 536/35 |
| 2,316,176 A * | 4/1943 | Lavett | .............................. | 159/11.1 |
| 2,316,459 A * | 4/1943 | Schmidt et al. | .................... | 34/92 |
| 2,332,296 A * | 10/1943 | Brunk | .............................. | 34/120 |
| 2,352,220 A * | 6/1944 | Overton | .......................... | 34/392 |
| 2,365,271 A * | 12/1944 | Hornbostel | ..................... | 165/278 |
| 2,401,832 A * | 6/1946 | Krogh | .............................. | 34/552 |
| 2,420,824 A * | 5/1947 | Hornbostel et al. | ............. | 34/125 |
| 2,435,842 A * | 2/1948 | Northcutt et al. | ............. | 426/473 |
| 2,437,004 A * | 3/1948 | Rutledge | .......................... | 34/124 |
| 2,440,778 A * | 5/1948 | Maglaughlin | ................. | 159/26.1 |
| 2,521,371 A * | 9/1950 | Hornbostel et al. | ............. | 34/125 |
| 2,537,379 A * | 1/1951 | Teeman et al. | ................... | 34/599 |
| 2,546,925 A * | 3/1951 | Geldhof et al. | .................... | 34/82 |
| 2,569,515 A * | 10/1951 | Collins | ............................ | 34/566 |
| 2,617,203 A * | 11/1952 | Murray | ............................. | 34/82 |

(Continued)

FOREIGN PATENT DOCUMENTS

DE 3408136 A1 * 9/1985

(Continued)

*Primary Examiner* — Stephen M. Gravini (57) ABSTRACT

A clothes dryer bearing structure has an arcuate channel for receiving the open end of a dryer drum. The channel has an inner wall portion, a base wall portion extending radially outward from the inner wall portion and an outer wall portion extending from the base wall portion. A gasket is positioned in the channel in contact with the dryer drum. The outer wall portion has a plurality of spaced apart elongated clips formed on the outer wall portion and curving back into the channel. At least one of the outer wall portion and the base wall portion has a plurality of elongated bumps protruding into the channel. Each of the elongated bumps is interspaced between the elongated clips whereby the gasket lies serpentinely in the channel ascending over bumps and descending below the clips to prevent slippage of the gasket along the channel during dryer drum rotation.

15 Claims, 6 Drawing Sheets

U.S. PATENT DOCUMENTS

| | | | | |
|---|---|---|---|---|
| 2,619,734 A | * | 12/1952 | Geldhof et al. | 34/546 |
| 2,624,124 A | * | 1/1953 | Irving | 34/135 |
| 2,780,010 A | * | 2/1957 | Hess | 34/109 |
| 2,783,551 A | * | 3/1957 | Giannini | 34/602 |
| 2,822,153 A | * | 2/1958 | Arnold | 366/229 |
| 2,865,111 A | * | 12/1958 | Geldhof | 34/95 |
| 2,866,273 A | * | 12/1958 | Geldhof | 34/75 |
| 2,875,996 A | * | 3/1959 | Hullar | 432/67 |
| 2,929,155 A | * | 3/1960 | Overton | 34/112 |
| 2,941,308 A | * | 6/1960 | Cobb et al. | 34/552 |
| 2,949,679 A | * | 8/1960 | MacCracken et al. | 34/598 |
| 2,964,297 A | * | 12/1960 | Davis et al. | 165/68 |
| 2,964,851 A | * | 12/1960 | Stelljes et al. | 34/82 |
| 2,970,383 A | * | 2/1961 | Hughes | 34/527 |
| 2,978,815 A | * | 4/1961 | Hieronymus | 34/125 |
| 2,984,472 A | * | 5/1961 | Marks | 432/135 |
| 3,000,108 A | * | 9/1961 | Jones et al. | 34/607 |
| 3,011,267 A | * | 12/1961 | Stone | 34/112 |
| 3,041,738 A | * | 7/1962 | Ray | 34/112 |
| 3,064,361 A | * | 11/1962 | Turner | 34/91 |
| 3,102,794 A | * | 9/1963 | Arnold | 34/371 |
| 3,116,985 A | * | 1/1964 | Kraus | 34/110 |
| 3,163,502 A | * | 12/1964 | Justus et al. | 34/114 |
| 3,210,863 A | * | 10/1965 | Nye, Jr. et al. | 34/533 |
| 3,223,395 A | * | 12/1965 | Genbauffe | 432/44 |
| 3,230,636 A | * | 1/1966 | Daane | 34/122 |
| 3,264,753 A | * | 8/1966 | Budzien | 34/112 |
| 3,267,701 A | * | 8/1966 | Mandarino | 68/12.15 |
| 3,281,953 A | * | 11/1966 | Mueller et al. | 34/528 |
| 3,284,918 A | * | 11/1966 | Malecki et al. | 34/547 |
| 3,330,047 A | * | 7/1967 | Rodgers | 34/532 |
| 3,343,272 A | * | 9/1967 | Janke et al. | 34/528 |
| 3,363,328 A | * | 1/1968 | Dickens et al. | 34/124 |
| 3,367,035 A | * | 2/1968 | Tomlinson | 34/359 |
| 3,399,464 A | | 9/1968 | Erickson et al. | |
| 3,409,997 A | * | 11/1968 | Krolzick et al. | 34/601 |
| 3,417,483 A | * | 12/1968 | Willard | 34/117 |
| 3,513,565 A | * | 5/1970 | Jacobson | 34/125 |
| 3,513,566 A | * | 5/1970 | Baird et al. | 34/601 |
| 3,621,293 A | * | 11/1971 | Heidtmann | 327/428 |
| 3,622,134 A | * | 11/1971 | Mazza | 432/105 |
| 3,675,337 A | * | 7/1972 | Daane | 34/454 |
| 3,696,521 A | * | 10/1972 | Hubbard | 34/128 |
| 3,724,094 A | * | 4/1973 | Appel et al. | 34/124 |
| 3,798,789 A | * | 3/1974 | Thompson | 34/108 |
| 3,808,700 A | * | 5/1974 | Kraus | 34/124 |
| 3,831,292 A | * | 8/1974 | DePas | 34/75 |
| 3,858,330 A | * | 1/1975 | De Pas | 34/75 |
| 3,859,004 A | * | 1/1975 | Condit | 34/75 |
| 3,861,055 A | * | 1/1975 | Thompson | 34/363 |
| 3,861,942 A | | 1/1975 | Guestaux | |
| 3,875,268 A | * | 4/1975 | DePass | 261/88 |
| 3,875,679 A | * | 4/1975 | Condit | 34/75 |
| 3,875,681 A | * | 4/1975 | De Pas | 34/75 |
| 4,069,596 A | | 1/1978 | Sisler | |
| 4,071,961 A | * | 2/1978 | Dietzel et al. | 34/108 |
| 4,208,807 A | * | 6/1980 | Candor | 34/254 |
| 4,283,862 A | * | 8/1981 | Candor | 34/254 |
| 4,338,729 A | * | 7/1982 | Candor | 34/254 |
| 4,404,754 A | * | 9/1983 | Candor | 34/254 |
| 4,430,809 A | | 2/1984 | Jackson et al. | |
| 4,467,529 A | * | 8/1984 | Candor | 34/254 |
| 4,538,360 A | * | 9/1985 | Chance et al. | 34/454 |
| 4,551,924 A | * | 11/1985 | Candor | 34/254 |
| 4,586,269 A | | 5/1986 | St. Louis | |
| 4,654,979 A | * | 4/1987 | Candor | 34/254 |
| 4,669,200 A | | 6/1987 | Carr | |
| 4,697,353 A | * | 10/1987 | Candor | 34/266 |
| 4,754,556 A | | 7/1988 | Carr | |
| 4,765,066 A | * | 8/1988 | Yoon | 34/261 |
| 4,773,166 A | * | 9/1988 | Candor | 34/254 |
| 4,949,477 A | * | 8/1990 | Geiger | 34/604 |
| 5,067,254 A | * | 11/1991 | Linkletter et al. | 34/137 |
| 5,216,823 A | | 6/1993 | Ripley | |
| 5,363,569 A | | 11/1994 | Kadakia | |
| 5,548,908 A | | 8/1996 | Torborg et al. | |
| 6,203,072 B1 | * | 3/2001 | Berghuis et al. | 285/24 |
| 6,212,792 B1 | * | 4/2001 | Bier | 34/315 |
| 6,415,527 B1 | * | 7/2002 | Rasanen et al. | 34/135 |
| 6,675,496 B1 | | 1/2004 | Moon et al. | |
| 7,007,955 B2 | | 3/2006 | Cross et al. | |
| 7,900,372 B2 | * | 3/2011 | Prajescu et al. | 34/235 |
| 2001/0010125 A1 | * | 8/2001 | Bier | 34/322 |
| 2006/0196076 A1 | | 9/2006 | Justice, III et al. | |
| 2008/0022551 A1 | * | 1/2008 | Banta et al. | 34/602 |
| 2009/0178295 A1 | * | 7/2009 | He et al. | 34/380 |

FOREIGN PATENT DOCUMENTS

| | | | |
|---|---|---|---|
| DE | 4418673 A1 | * | 11/1995 |
| EP | 365851 A1 | * | 5/1990 |
| FR | 2761145 A1 | * | 9/1998 |
| GB | 2297588 A | * | 8/1996 |
| JP | 54150774 A | * | 11/1979 |
| JP | 58152639 A | * | 9/1983 |
| JP | 58165734 A | * | 9/1983 |
| JP | 60043340 A | * | 3/1985 |
| JP | 62030631 A | * | 2/1987 |
| JP | 63310700 A | * | 12/1988 |
| JP | 01076900 A | * | 3/1989 |
| JP | 04122298 A | * | 4/1992 |
| JP | 04307096 A | * | 10/1992 |
| JP | 04367697 A | * | 12/1992 |
| JP | 07103646 A | * | 4/1995 |
| JP | 09094390 A | * | 4/1997 |
| JP | 11156096 A | * | 6/1999 |
| JP | 11197397 A | * | 7/1999 |
| JP | 2000105074 A | * | 4/2000 |
| JP | 2010012088 A | * | 1/2010 |
| JP | 2010012089 A | * | 1/2010 |
| WO | WO 2005033400 A2 | * | 4/2005 |
| WO | WO 2010076135 A1 | * | 7/2010 |

* cited by examiner

CLOTHES DRYER BEARING GASKET SUPPORT

FIELD OF THE INVENTION

The present invention relates to a clothes dryer front bearing structure that fits within an open end of a dryer drum. More particularly the present invention relates to the positioning of a gasket in the front bearing structure.

BACKGROUND TO THE PRESENT INVENTION

Various bearing structures have been used to support the rotating dryer drum within the cabinet of a dryer. Such support may take the form of a substantially axial shaft extending from the closed end of the drum and received in a suitable bearing. More generally there are bearings on both ends of the drum. In some cases roller bearings have been used at the open end of the drum on which an outside surface of the drum turns. In other cases, the bearing structure at the open end of the drum is mounted to the front panel of the dryer cabinet and provides a generally circular supporting ring that fits inside the open end of the drum. In some cases a felt material surrounds the generally circular supporting ring. In this case, the drum engages the felt material.

In one dryer bearing structure, the dryer bearing comprises upper and lower bearing structural portions fitted together and mounted to the front panel of the dryer cabinet by snapping hooks and/or screws. The two bearing structural portions provide a ring like bearing support surface and form the front bulkhead within the open end of the clothes dryer drum, including an opening for clothes to pass into the drum. The upper bearing structural portion has a plurality of lower frictional wear resistant glides that are mounted to the ring like bearing support surface of the upper bearing structural portion. The glides carry most of the load of the dryer drum at the open end of the drum. The lower bearing structural portion comprises a plurality of air flow openings through which air exits from the drum. The lower bearing portion typically provides a recessed groove or channel extending about the ring like bearing support surface and into which the open end of the drum extends. The channel carries some of the load of the open end of the dryer. A gasket is positioned in the channel in contact with the rotating open end of the drum and provides a lower frictional surface against which the drum rotates. The gasket also reduce noise generation in this part of the bearing. The gasket is prevented from moving axially (perpendicular to a plane defined by the ring like bearing surface) out of the channel by clips formed in the outer wall of the channel. However, the gasket may in some instances be able to slip around or along the channel during dryer operation reducing the benefit of utilizing the gasket. Accordingly, there is a need for a bearing structure that prevents slippage of the gasket along the channel during dryer operation.

BRIEF DESCRIPTION OF THE INVENTION

The present invention relates to a clothes dryer front bearing structure that fits within an open end of a dryer drum. More particularly the present invention relates to the positioning of a gasket in the front bearing structure.

The bearing structure has a lower bearing portion having an arcuate channel comprising an arcuate inner wall portion positioned inside the open end of the dryer drum, a base wall portion extending radially outward from the arcuate inner wall portion to form a base for the channel, and an arcuate outer wall portion extending from the base wall portion outside of the open end of the dryer drum and spaced from the arcuate inner wall portion. A gasket is positioned in the channel in contact with the dryer drum. The arcuate outer wall portion comprises a plurality of spaced apart elongated clips formed on the outer wall portion and curving back into the channel for grasping the gasket and preventing the gasket from moving axially out of the channel during dryer drum rotation. At least one of the base wall portion and the arcuate outer wall portion comprises a plurality of elongated bumps protruding into the channel. Each of the elongated bumps is interspaced between the elongated clips whereby the gasket lies serpentinely in the channel ascending over bumps and descending below the clips to prevent slippage of the gasket along the channel during dryer drum rotation.

In one embodiment, the base wall portion may be angled relative to each of the arcuate inner wall portion and arcuate outer wall portion. In another embodiment, the base wall portion may curve into one or both of the arcuate inner wall portion and the arcuate outer wall portion.

In one embodiment the bumps each comprise step like members formed from each of the arcuate outer wall portion and the base portion each having a tread portion located between two riser portions with the riser portions being located adjacent a corresponding elongated clip. The riser acts to provide an abrupt change in the floor of the base wall portion that causes the gasket to sharply turn. In a preferred embodiment, the tread portion is formed from the arcuate outer wall portion and meets the tread portion formed from the base wall at an obtuse angle. The arcuate outer wall portion has an outer surface portion generally parallel to the inner wall portion whereby the tread portion of the arcuate outer wall portion slopes towards the outer surface portion. In an alternative embodiment, it is envisaged that the bumps may comprise rounded protrusions into the channel.

In one embodiment, the clips have hook shaped corners adapted to bite into the gasket. Further, the base wall portion has a plurality of elongated apertures where each aperture is located adjacent a corresponding one of the elongated clips.

In accordance with an embodiment of the invention there is provided a clothes dryer comprising a dryer drum having an open end, a front panel, and a bearing structure for fitting into and rotatably supporting the open end of the dryer drum relative to the front panel. The arcuate channel comprises a lower bearing portion comprising an arcuate channel for rotatably receiving the open end of the dryer drum The lower bearing portion comprising an arcuate inner wall portion positioned inside the open end of the dryer drum, a base wall portion extending radially outward from the arcuate inner wall portion to form a base for the channel, and an arcuate outer wall portion extending from the base wall portion outside of the open end of the dryer drum and spaced from the arcuate inner wall portion. A gasket is positioned in the channel in contact with the open end of the dryer drum. The arcuate outer wall portion comprises a plurality of spaced apart elongated clips formed on the arcuate outer wall portion and curving back into the channel for grasping the gasket and preventing the gasket from moving axially out of the channel during dryer drum rotation. At least one of the base wall portion and the arcuate outer wall comprises a plurality of elongated bumps protruding into the channel. Each of the elongated bumps is interspaced between the elongated clips whereby the gasket lies serpentinely in the channel ascending over bumps and descending below the clips to prevent slippage of the gasket along the channel during dryer drum rotation.

BRIEF DESCRIPTION OF THE DRAWINGS

For a better understanding of the nature and objects of the present invention reference may be had by way of example to the accompanying diagrammatic drawings in which.

DETAILED DESCRIPTION OF THE INVENTION

The present invention relates to a clothes dryer front bearing structure that fits within an open end of a dryer drum. More particularly the present invention relates to the positioning of a gasket in the front bearing structure.

Figure 1:
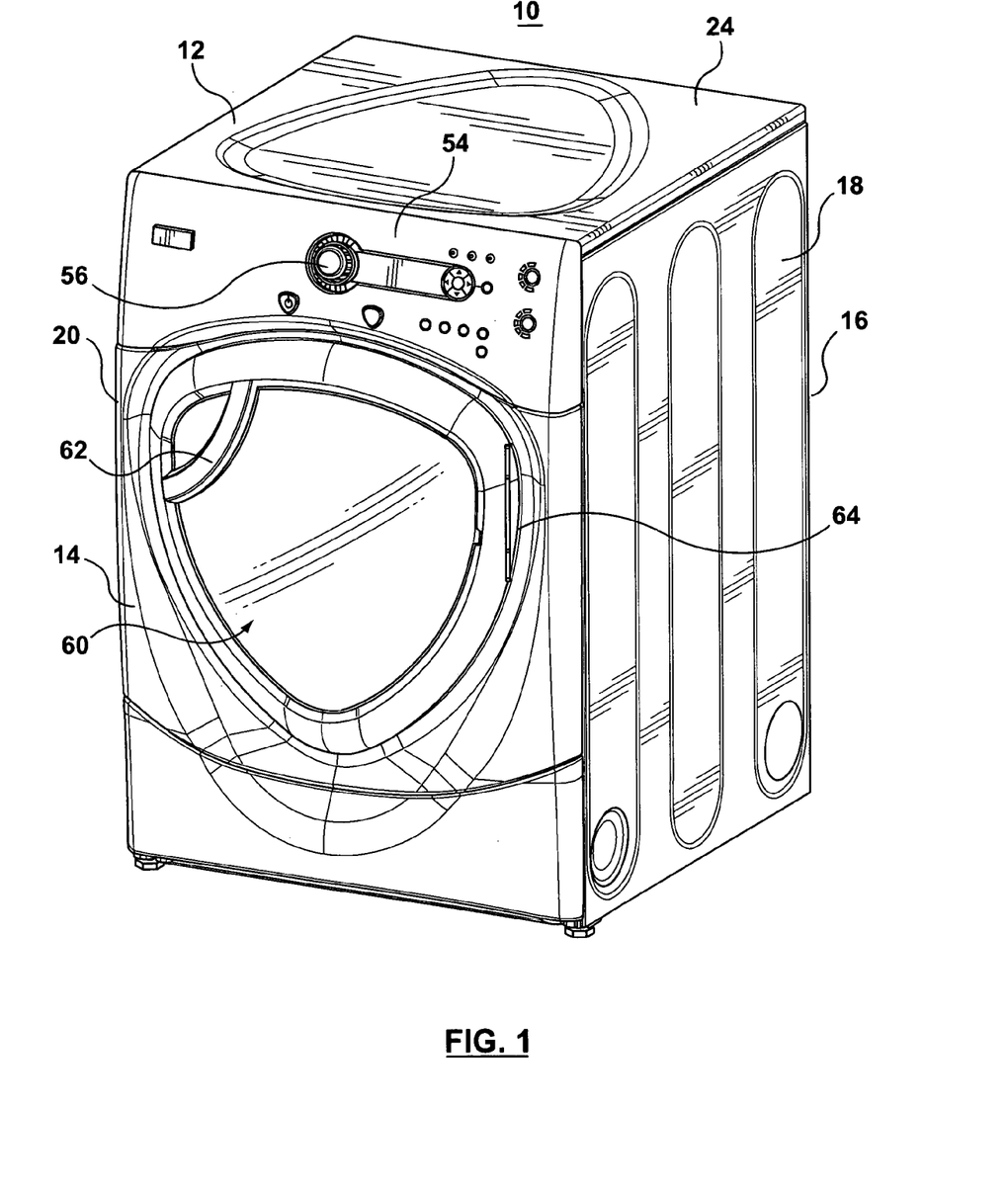
FIG. 1 is a perspective view of an exemplary clothes dryer that may benefit from the present invention.
Figure 2:
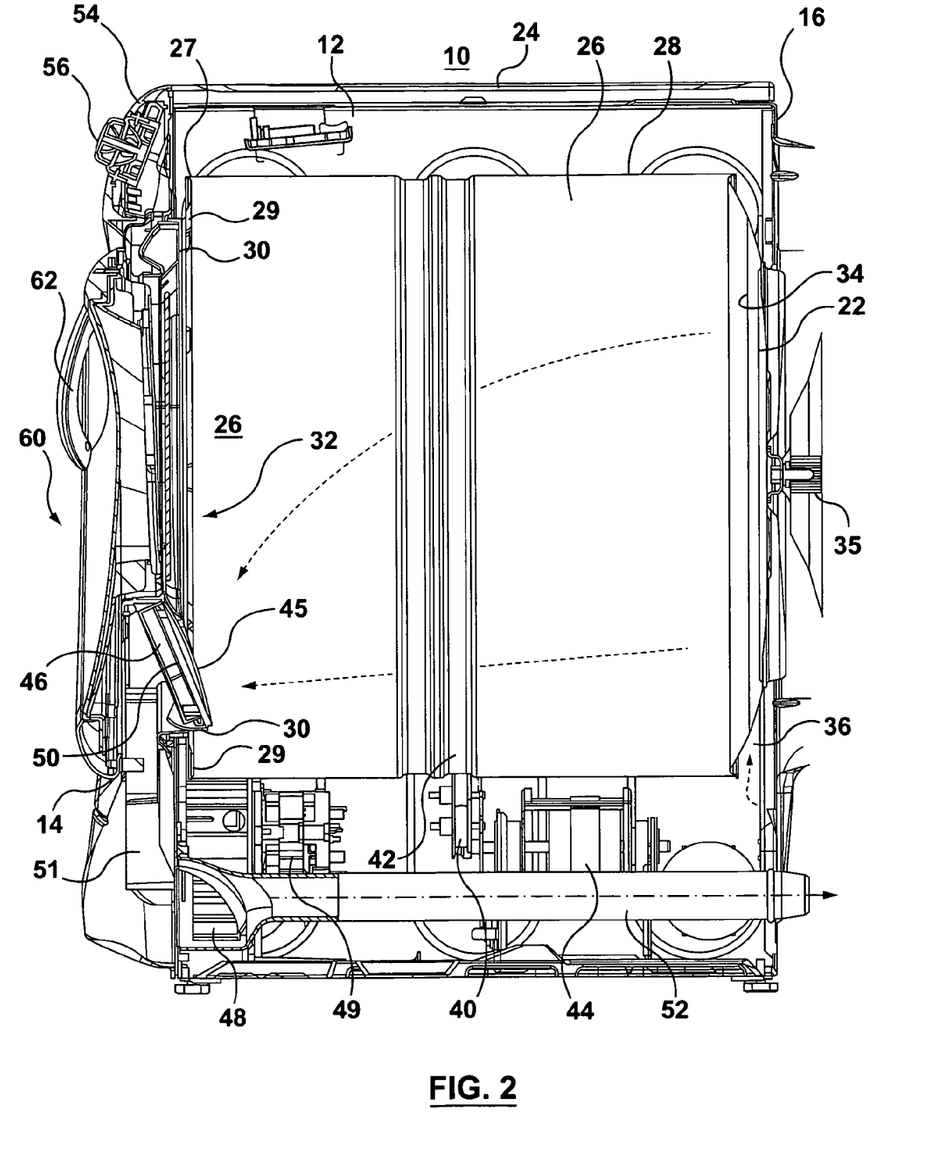
FIG. 2 is a side sectional view of an exemplary clothes dryer that may benefit from the present invention.

FIGS. 1 and 2 show perspective and side sectional views of an exemplary clothes dryer 10 that may benefit from the present invention. The clothes dryer 10 includes a cabinet or a main housing 12 having a front panel 14, a rear panel 16, a pair of side panels 18 and 20 spaced apart from each other by the front and rear panels, and a top cover 24. Within the housing 12 is a drum or container 26 mounted for rotation around a substantially horizontal axis. A motor 44 rotates the drum 26 about the horizontal axis through, for example, a pulley 40 and a belt 42. The drum 26 is generally cylindrical in shape, has an imperforate outer cylindrical wall 28, and has an open end 27 that typically comprises a metal ring 29 attached by welding to the drum 26 for reducing the diameter of the opening of the drum 26 to match a front bulkhead structure or bearing 30. The bearing 30 further defines an opening 32 into the drum 26. Clothing articles and other fabrics are loaded into the drum 26 through the opening 32. A plurality of tumbling ribs (not shown) are provided within the drum 26 to lift the articles and then allow them to tumble back to the bottom of the drum as the drum rotates. The drum 26 includes a rear wall 34 rotatably supported within the main housing 12 by a suitable fixed bearing 35. The rear wall 34 includes a plurality of holes (not shown) that receive hot air that has been heated by a heater such as electrical heating elements (not shown) in the heater housing 22. The housing 22 receives ambient air via an inlet 36. Although the exemplary clothes dryer 10 shown in FIG. 1 is an electric dryer, it could just as well be a gas dryer having a gas burner.

After the clothing articles have been dried, they are removed from the drum 26 via the opening 32. The dryer has a control panel 54 with touch and or dial controls 56 whereby a user can control the operation of the dryer. Clothes are inserted into, and removed from, the drum 26 through opening 32. Opening 32 is shown closed by a window or port-hole like door 60. Door 60 has a handle 62 for pivotally opening the door about hinge 64.

Heated air is drawn from the drum 26 by a blower fan 48 which is also driven by a second motor 49 in the embodiment shown. In an alternative embodiment, motor 44 could be used to drive blower fan 48. The air passes out of the drum through a grill 45 and screen filter 46. Grill 45 keeps clothing articles tumbling in the drum 26 from contacting the filter 46 and touching the lint trapped by the filter 46 within the trap duct 50. As the air passes through the screen filter 46, it flows through lower duct portion 51 and is drawn by blower wheel 48 attached to motor 49 out of the clothes dryer through an exhaust duct 52. In this embodiment, the drum 26 is in air flow communication with the trap duct 50 whose lower duct portion 51 has an outlet that is in air flow communication with the blower wheel 48 and the exhaust duct 52.

Figure 3:
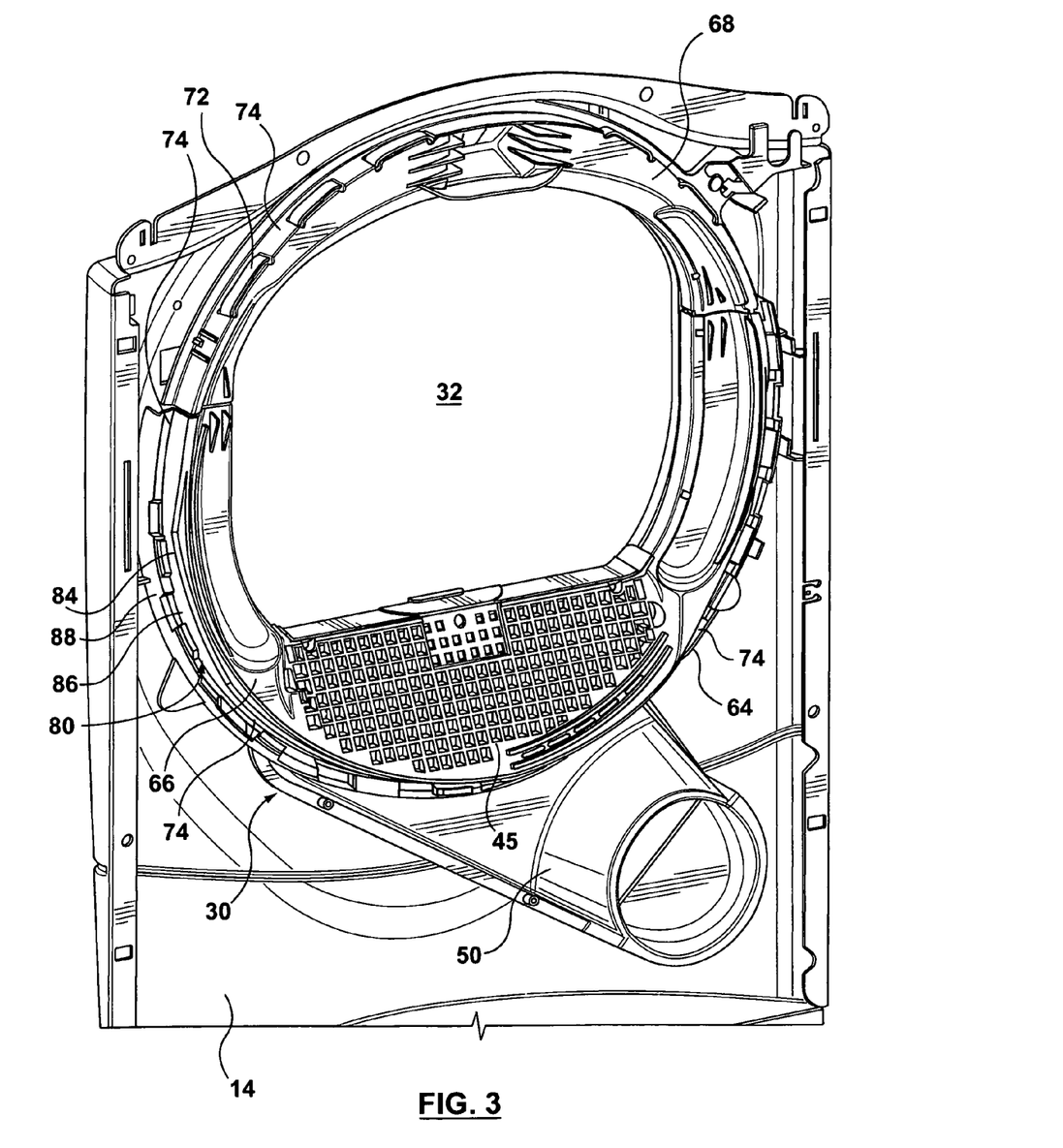
FIG. 3 is a perspective inside view showing the bearing structure mounted to the front panel of the clothes dryer.
Figure 5:
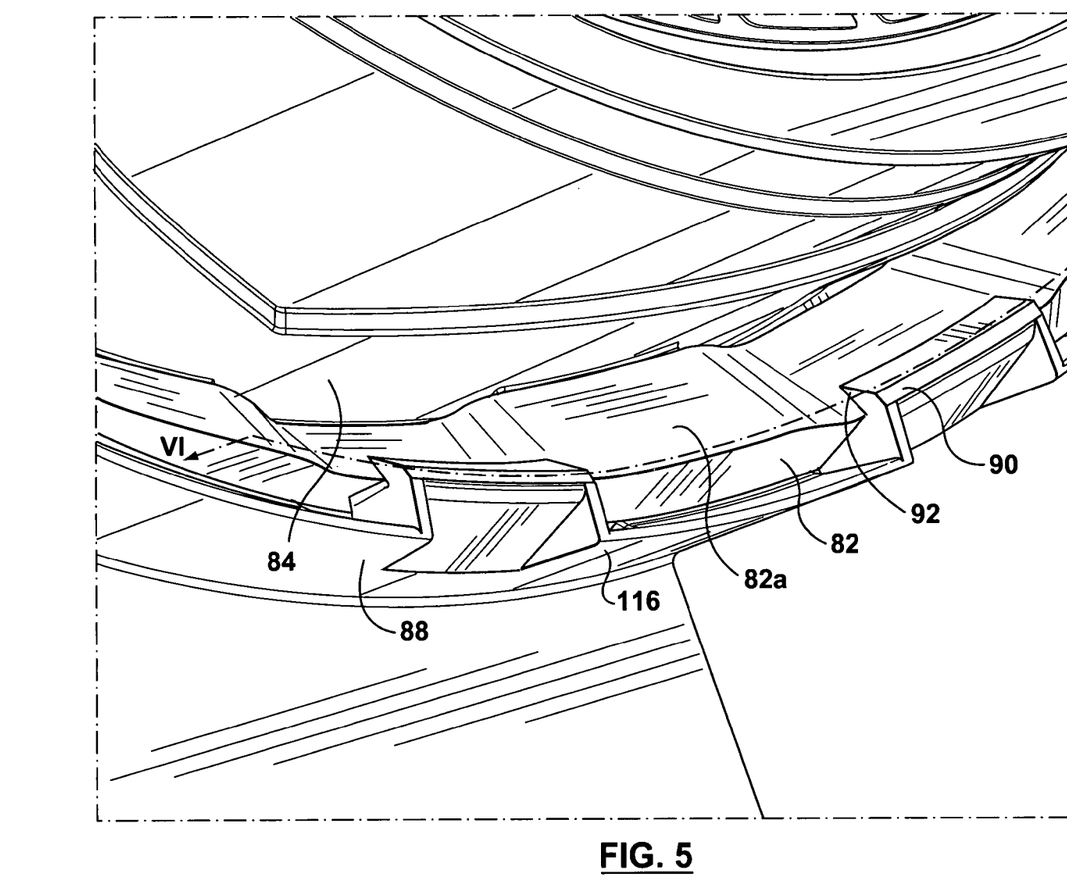
FIG. 5 is an enlarged partial perspective view similar to FIG. 5 and having the gasket in place; and, FIG. 6 is a sectional view taken at lines VI-Vi for FIG. 5.

Referring to FIG. 3, it can be seen that the front bulkhead structure or front bearing structure 30 comprises a lower bearing portion 66 and an upper bearing portion 68. These two portions 66, 68 are formed from a mold of plastic material and are connected together and then subsequently fastened to the front panel 14 by suitable snapping hooks 70 (FIG. 5) and screws (not shown). In other dryer embodiments, the two portions 66 and 68 of the bearing structure may be formed as a single unit. The front bearing structure 30 has multiple purposes within this dryer. One purpose is to act as a bearing structure for the open end 27 of the drum 26. Another function is to provide a front bulkhead wall with an opening that faces into the dryer drum 26. The lower bearing portion 66 carries a lower wall portion below the access opening 32 that includes the grill 45. However, the present invention is directed primarily to the lower bearing portion 66 of the front bearing structure 30 for supporting the open end 27 of the dryer drum 26.

Figure 4:
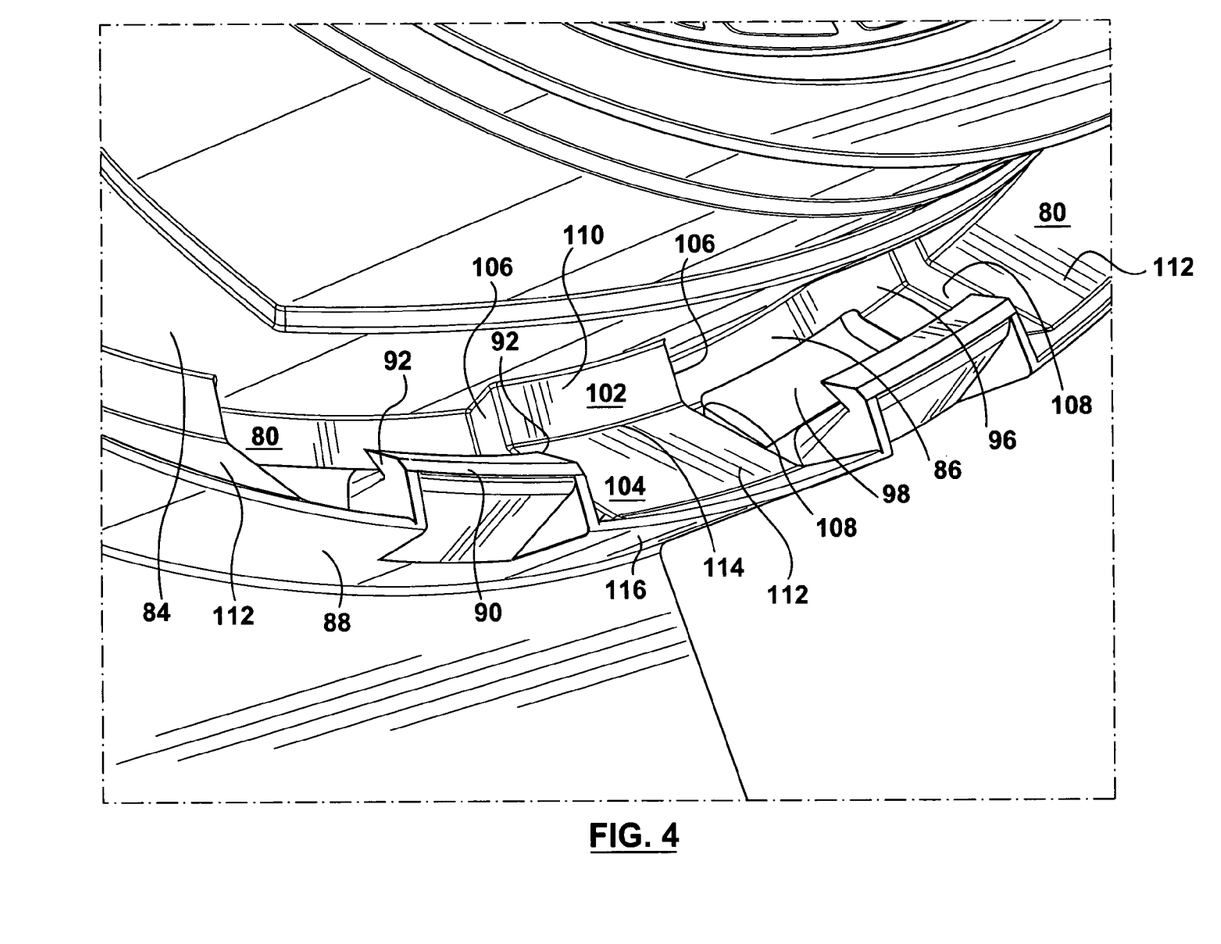
FIG. 4 is an enlarged partial perspective inside view of the arcuate channel having not gasket in place.

Referring now to FIGS. 3 and 4, five elongated wear resistant bearing glides 72 are spaced about and mounted to the upper bearing portion 68. The upper bearing portion 68 and lower bearing portion 66 together define a generally cylindrical support wall 74 that fits into the opened end 27 of the dryer drum 26. The elongated bearing glide 72 may comprise any suitable bearing structure. In one embodiment shown, both nylon glides and polytetrafluoroethylene material glides are used. The polytetrafluoroethylene glides are those made by Dewal Industries under part number 540B387P002. The polytetrafluoroethylene glides are located in an uppermost portion of the bearing structure to carry a good portion of the load associated with the open end of the dryer drum. The lower glides 72 are of nylon. The glides 72 provide a lower frictional, wear resistant surface for the open end 27 of the dryer drum 26 to rotate about. The upper bearing portion and the glides 72 carry a major portion of the load associated the open end 27 of the dryer drum 26.

Referring to FIGS. 3 to 6, the lower bearing portion 66 comprises an arcuate channel 80. The arcuate channel 80 is adapted to rotatably receive the open end 27 of the dryer drum 26 and carry some of the load associated with the open end of the dryer drum. It should be understood that the channel could, in an alternative embodiment, extend completely around the bearing structure 30. Positioned in the channel 80 is a gasket 82 that contacts the open end 27 of the drum 26 along a gasket surface 82a (see FIG. 5). Gasket 82 presents a surface of reduced friction and sealing to reduce noise at this part of the bearing. The gasket 82 comprises a felt-like material.

The arcuate channel 80 has an arcuate inner wall portion 84 positioned inside the open end 27 of the dryer drum 26. The arcuate inner wall portion 84 forms part of the generally cylindrical support wall 74 that extends along the lower bearing portion 66.

The channel 80 further comprises a base wall portion 86 extending radially outward from the arcuate inner wall portion 84 to form a base or floor 96 for the channel 80. The base wall portion 86 comprises a plurality of elongated apertures 98 located in the base floor 96 and into which portions of the gasket 82 may extend.

The channel 80 further comprises an arcuate outer wall portion 88 that extends from the base wall portion 86 outside of the open end 27 of the dryer drum 26. The outer wall portion 88 is spaced from the inner wall portion 86 and generally is parallel to the inner wall portion 86.

The arcuate outer wall portion 86 has a plurality of spaced apart elongated clips 90 formed on the outer wall portion curving back into the channel 80. Each of the clips 90 has two opposing hook shaped corners 92 adapted to bite into the gasket 82. The clips 90 act to grasp the gasket 82 and prevent it from moving axially out of the channel 80 during dryer rotation. The clips 90 are positioned adjacent and spaced from a corresponding one of the elongated apertures 98 in the base wall portion 86.

In the embodiment shown, both of the base wall portion 86 and the arcuate outer wall portion 88 comprise plurality of elongated bumps 102, 104, respectively that protrude into the channel 80. Each of the elongated bumps 102, 104 is interspaced between the elongated clips 90.

Figure 6:
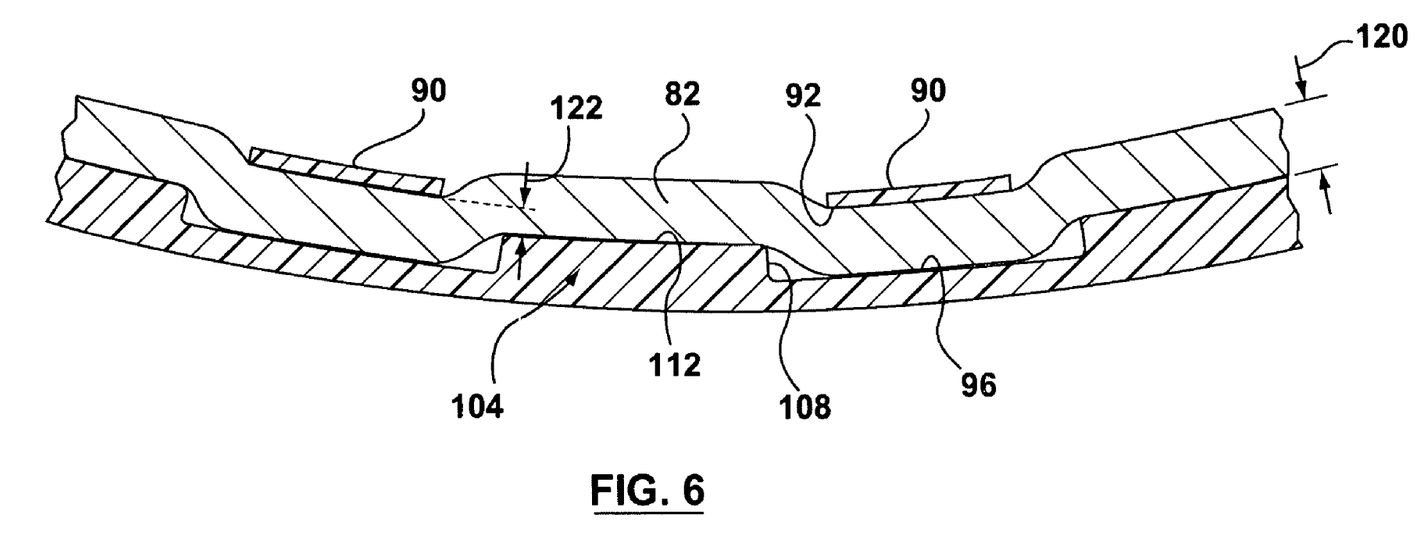

Each of the bumps 102, 104 are shown to comprise step like members that are respectively formed from each of the base wall portion 86 and the arcuate outer wall portion 88. Each of the bumps 102, 104 has an elongated tread portion 110, 112 located between corresponding riser portions 106, 108 with the riser portions 106, 108 being located adjacent a corresponding elongated clip 90. The tread portion 112 is formed from the arcuate outer wall portion 88 and meets the tread portion 110 formed from the base wall portion 86 and meet at junction 114 at an obtuse angle. The arcuate outer wall portion 88 has an outer surface portion 116 generally parallel to the arcuate inner wall portion 84 whereby the tread portion 112 of the arcuate outer wall portion 88 slopes towards the outer surface portion 116. As shown in FIG. 6, the gasket 82 has a thickness 120 that is greater than the distance 122 between the riser 112 of the base wall portion 86 and the adjacent clip 90. In FIG. 6, the difference in thickness 120 and distance 122 is exaggerated.

The bumps 102 and 104 co-operate with the clips 90 to cause the gasket 82 to lie serpentinely in the channel 80 ascending over bumps 102, 104 and descending below the clips 90 to prevent slippage of the gasket 82 along the channel 80 during dryer drum rotation.

While the invention has been described in terms of various specific embodiments, those skilled in the art will recognize that the invention can be practiced with modifications within the spirit and scope of the present invention as disclosed herein.

What is claimed is:

1. A clothes dryer comprising a dryer drum having an open end, a front panel, and a bearing structure for fitting into and rotatably supporting the open end of the dryer drum relative to the front panel, the bearing structure comprising:
a lower bearing portion comprising an arcuate channel for rotatably receiving the open end of the dryer drum, the arcuate channel comprising an arcuate inner wall portion positioned inside the open end of the dryer drum, a base wall portion extending radially outward from the arcuate inner wall portion to form a base for the channel, and an arcuate outer wall portion extending from the base wall portion outside of the open end of the dryer drum and spaced from the arcuate inner wall portion;
a gasket positioned in the channel in contact with the open end of the dryer drum;
the arcuate outer wall portion comprising a plurality of spaced apart elongated clips formed on the arcuate outer wall portion and curving back into the channel for grasping the gasket and preventing the gasket from moving axially out of the channel during dryer drum rotation; and
at least one of the base wall portion and the arcuate outer wall portion and the base wall portion a plurality of elongated bumps protruding into the channel, each of the elongated bumps being interspaced between the elongated clips whereby the gasket lies serpentinely in the channel ascending over bumps and descending below the clips to prevent slippage of the gasket along the channel during dryer drum rotation.

2. The clothes dryer of claim 1 wherein the bumps each comprise step like members formed from each of base wall portion and the arcuate outer wall portion, each having a tread portion located between two riser portions with the riser portions being located adjacent a corresponding elongated clip.

3. The clothes dryer of claim 2 wherein the tread portion is formed from the arcuate outer wall portion and meets the tread portion formed from the base wall at an obtuse angle.

4. The clothes dryer of 3 wherein the arcuate outer wall portion has an outer surface portion generally parallel to the inner wall portion whereby the tread portion of the arcuate outer wall portion slopes towards the outer surface portion.

5. The clothes dryer of claim 1 wherein the clips have hook shaped corners adapted to bite into the gasket.

6. The clothes dryer of claim 2 wherein the clips have hook shaped corners adapted to bite into the gasket.

7. The clothes dryer of claim 3 wherein the clips have hook shaped corners adapted to bite into the gasket.

8. The clothes dryer of claim 1 wherein the base wall portion has a plurality of elongated apertures where each aperture is located adjacent a corresponding one of the elongated clips.

9. The clothes dryer of claim 2 wherein the base wall portion has a plurality of elongated apertures where each aperture is located adjacent a corresponding one of the elongated clips.

10. The clothes dryer of claim 3 wherein the base wall portion has a plurality of elongated apertures where each aperture is located adjacent a corresponding one of the elongated clips.

11. The clothes dryer of claim 7 wherein the base wall portion has a plurality of elongated apertures where each aperture is located adjacent a corresponding one of the elongated clips.

12. The clothes dryer of claim 11 wherein the bearing structure comprises a bottom wall portion located below an access opening for the dryer and the bottom wall portion comprises the lower bearing portion and a grill portion having a plurality of air exhaust openings located between the lower bearing portion and the access opening, the grill portion being angled into the drum from the access opening.

13. The clothes dryer of claim 1 wherein the bearing structure comprises a bottom wall portion located below an access opening for the dryer and the bottom wall portion comprises the lower bearing portion and a grill portion having a plurality of air exhaust openings located between the lower bearing portion and the access opening, the grill portion being angled into the drum from the access opening.

14. The clothes dryer of claim 2 wherein the bearing structure comprises a bottom wall portion located below an access opening for the dryer and the bottom wall portion comprises the lower bearing portion and a grill portion having a plurality of air exhaust openings located between the lower bearing portion and the access opening, the grill portion being angled into the drum from the access opening.

15. The clothes dryer of claim 5 wherein the gasket has a thickness that is greater than a radial distance measured between the riser portion of the base wall and an adjacent clip.

* * * * *